United States Patent
Berrio et al.

(10) Patent No.: US 9,424,566 B2
(45) Date of Patent: *Aug. 23, 2016

(54) PAYMENT PROCESSING SYSTEM FOR USE IN A RETAIL ENVIRONMENT HAVING SEGMENTED ARCHITECTURE

(71) Applicant: Gilbarco Inc., Greensboro, NC (US)

(72) Inventors: Gaston Berrio, Greensboro, NC (US); Michael James Symonds, Greensboro, NC (US); Ronald Philip Klinc, Wake Forest, NC (US); Andrew Richard Pearce, Raleigh, NC (US)

(73) Assignee: Gilbarco Inc., Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/936,222

(22) Filed: Nov. 9, 2015

(65) Prior Publication Data

US 2016/0063470 A1    Mar. 3, 2016

Related U.S. Application Data

(63) Continuation of application No. 13/872,201, filed on Apr. 29, 2013, now abandoned, which is a continuation (Continued)

(51) Int. Cl.
*G06Q 20/00* (2012.01)
*G06Q 20/20* (2012.01)
(Continued)

(52) U.S. Cl.
CPC ............. *G06Q 20/204* (2013.01); *G06Q 20/10* (2013.01); *G06Q 20/18* (2013.01); *G06Q 20/20* (2013.01);
(Continued)

(58) Field of Classification Search
CPC . G06Q 20/202; G06Q 20/204; G06Q 20/206; G06Q 20/40; G06Q 20/10; G06Q 20/20; G06Q 20/18; G06Q 20/382; G07G 1/12; G07G 1/14; G07F 15/001

USPC ................................................ 705/16, 18, 21
See application file for complete search history.

(56) References Cited

U.S. PATENT DOCUMENTS 4,055,746 A * 10/1977 Peterson ................ G06K 7/083
                                                                235/380
4,750,130 A *  6/1988 Shimamura ............ B67D 7/228
                                                                 345/56

(Continued)

FOREIGN PATENT DOCUMENTS

EP          1143388 A2    10/2001

OTHER PUBLICATIONS

J2 Retail system Targets, Tolkoff, Sarah. Orange county Business Journal 31.39 (Sep. 29-Oct. 5, 2008).*

(Continued)

*Primary Examiner* — Matthew Gart
*Assistant Examiner* — Harshad Parikh
(74) *Attorney, Agent, or Firm* — Nelson Mullins Riley & Scarborough, LLP

(57) ABSTRACT

A payment processing system and method comprising a POS module providing an interface to effect sales of FGS in a retail environment, a device module operatively connected to at least one retail device configured to supply FGS and comprising a card reader adapted to receive a first payment card data for payment for the FGS, wherein the device module is adapted to control operation of the at least one retail device, and a payment system module operatively connected to the POS module and the device module, the payment system module adapted to validate payment for the FGS. The payment system module and the device module are separated from the POS module in order to segment a portion of the payment processing system configured to handle payment card data from a portion of the system that does not handle payment card data.

5 Claims, 3 Drawing Sheets

Related U.S. Application Data of application No. 13/287,786, filed on Nov. 2, 2011, now Pat. No. 8,438,064, which is a continuation of application No. 12/689,983, filed on Jan. 19, 2010, now abandoned.

(60) Provisional application No. 61/145,578, filed on Jan. 18, 2009.

(51) Int. Cl.
| | | |
|---|---|---|
| *G07G 1/12* | (2006.01) | |
| *G06Q 20/40* | (2012.01) | |
| *G06Q 30/06* | (2012.01) | |
| *G07G 1/14* | (2006.01) | |
| *G06Q 20/10* | (2012.01) | |
| *G06Q 20/18* | (2012.01) | |
| *G06Q 20/38* | (2012.01) | |
| *G07F 15/00* | (2006.01) | |

(52) U.S. Cl.
CPC ............ *G06Q 20/202* (2013.01); *G06Q 20/206* (2013.01); *G06Q 20/382* (2013.01); *G06Q 20/40* (2013.01); *G06Q 30/06* (2013.01); *G07F 15/001* (2013.01); *G07G 1/12* (2013.01); *G07G 1/14* (2013.01)

(56) References Cited

U.S. PATENT DOCUMENTS

| | | | | |
|---|---|---|---|---|
| 5,394,336 A * | 2/1995 | Warn | B67D 7/08 | 700/236 |
| 5,694,326 A * | 12/1997 | Warn | G07F 13/025 | 700/231 |
| 5,790,410 A * | 8/1998 | Warn | G06Q 20/363 | 235/381 |
| 5,831,861 A * | 11/1998 | Warn | B67D 7/04 | 222/52 |
| 5,889,676 A | 3/1999 | Kubo et al. | | |
| 5,895,453 A * | 4/1999 | Cook | G06Q 20/20 | 348/150 |
| D413,337 S * | 8/1999 | Keane | D15/9.2 | |
| 6,029,152 A * | 2/2000 | Bublitz | G06Q 20/02 | 705/17 |
| 6,032,126 A * | 2/2000 | Kaehler | G06Q 20/20 | 235/381 |
| 6,070,156 A * | 5/2000 | Hartsell, Jr. | B67D 7/067 | 141/198 |
| 6,078,888 A * | 6/2000 | Johnson, Jr. | G06Q 20/027 | 380/270 |
| 6,089,284 A * | 7/2000 | Kaehler | B67D 7/348 | 141/2 |
| 6,116,505 A * | 9/2000 | Withrow | G06Q 20/342 | 235/375 |
| 6,253,027 B1 * | 6/2001 | Weber | G06Q 20/00 | 380/287 |
| 6,321,984 B1 | 11/2001 | McCall et al. | | |
| 6,360,138 B1 * | 3/2002 | Coppola | G06Q 20/341 | 700/231 |
| 6,442,448 B1 * | 8/2002 | Finley | B67D 7/145 | 700/231 |
| 6,470,233 B1 * | 10/2002 | Johnson, Jr. | B67D 7/067 | 141/351 |
| 6,644,547 B1 * | 11/2003 | White | G06Q 20/04 | 235/381 |
| 6,736,313 B1 * | 5/2004 | Dickson | G06Q 20/20 | 235/380 |
| 6,882,900 B1 * | 4/2005 | Terranova | B67D 7/067 | 700/236 |
| 6,978,661 B2 * | 12/2005 | Hutchinson | B67D 7/3209 | 137/557 |
| 7,082,406 B1 * | 7/2006 | Dickson | B67D 7/145 | 705/16 |
| 7,197,477 B2 * | 3/2007 | Merten | G06Q 20/20 | 705/16 |
| 7,201,315 B2 * | 4/2007 | Symonds | G06Q 30/06 | 235/380 |
| 7,407,095 B1 * | 8/2008 | Liu | G06Q 20/04 | 235/379 |
| 7,469,826 B2 * | 12/2008 | Ciancio | G06Q 30/0224 | 235/381 |
| 7,558,742 B2 * | 7/2009 | Kloubakov | G06Q 20/20 | 705/16 |
| 7,624,042 B2 * | 11/2009 | Negley, III | G06Q 20/202 | 235/381 |
| 7,637,365 B2 * | 12/2009 | Ringdahl | B60S 3/047 | 194/205 |
| 7,725,351 B1 * | 5/2010 | Williams | G06Q 20/10 | 235/7 R |
| 7,748,621 B2 * | 7/2010 | Gusler | G06Q 30/06 | 235/380 |
| 7,752,133 B2 * | 7/2010 | Rich | G06Q 20/10 | 705/40 |
| 7,810,722 B2 * | 10/2010 | Dodson | G06F 17/3089 | 235/381 |
| 7,953,968 B2 * | 5/2011 | Robertson | G07F 7/1008 | 713/150 |
| 8,020,763 B1 * | 9/2011 | Kowalchyk | G06Q 20/102 | 235/380 |
| 8,108,272 B2 * | 1/2012 | Sorbe | G06Q 20/10 | 235/384 |
| 8,285,506 B2 * | 10/2012 | Oldham | G01F 25/00 | 222/23 |
| 8,376,185 B2 * | 2/2013 | Liebal | B67D 7/08 | 137/1 |
| 8,438,064 B2 * | 5/2013 | Berrio | G06Q 20/10 | 705/16 |
| 2001/0045457 A1 | 11/2001 | Terranova et al. | | |
| 2002/0147648 A1 * | 10/2002 | Fadden | G06Q 20/20 | 705/16 |
| 2004/0079799 A1 * | 4/2004 | Symonds | G06Q 30/06 | 235/381 |
| 2004/0182921 A1 | 9/2004 | Dickson et al. | | |
| 2004/0204999 A1 * | 10/2004 | Negley, III | G06Q 20/202 | 705/16 |
| 2005/0080679 A1 * | 4/2005 | Barton | A47F 9/048 | 705/16 |
| 2005/0091661 A1 * | 4/2005 | Kurien | G06F 21/53 | 719/310 |
| 2005/0145015 A1 * | 7/2005 | Hutchinson | B65D 90/503 | 73/40.5 R |
| 2005/0205157 A1 * | 9/2005 | Hutchinson | B67D 7/3209 | 141/311 A |
| 2006/0012479 A1 * | 1/2006 | Ezra | B67D 7/145 | 340/572.1 |
| 2007/0033398 A1 * | 2/2007 | Robertson | G07F 7/1008 | 713/168 |
| 2007/0106559 A1 * | 5/2007 | Harrell | G06Q 20/12 | 705/21 |
| 2007/0250391 A1 * | 10/2007 | Prade | A47F 10/00 | 705/16 |
| 2007/0294340 A1 * | 12/2007 | Rothschild | G06Q 30/02 | 709/203 |
| 2008/0126213 A1 * | 5/2008 | Robertson | G06Q 20/20 | 705/21 |
| 2008/0147539 A1 | 6/2008 | Robertson | | |
| 2008/0154427 A1 * | 6/2008 | Siler | G06Q 20/20 | 700/232 |
| 2008/0249880 A1 * | 10/2008 | Liu | G06Q 20/04 | 705/14.36 |
| 2008/0262936 A1 * | 10/2008 | Paardekooper | G06Q 20/20 | 705/21 |
| 2008/0295568 A1 * | 12/2008 | Nanaji | B67D 7/085 | 73/1.34 |
| 2008/0313062 A1 * | 12/2008 | Williams | B60S 5/02 | 705/30 |
| 2008/0313078 A1 * | 12/2008 | Payne | G06Q 20/40 | 705/44 |
| 2009/0084840 A1 * | 4/2009 | Williams | G06Q 20/3274 | 235/379 |
| 2009/0089214 A1 * | 4/2009 | Weston | G06Q 20/20 | 705/73 |
| 2009/0103725 A1 * | 4/2009 | Tang | G06Q 20/20 | 380/45 |

(56) References Cited

U.S. PATENT DOCUMENTS

| | | | |
|---|---|---|---|
| 2009/0129403 A1* | 5/2009 | Harrell | G07F 13/02 370/467 |
| 2009/0132381 A1* | 5/2009 | Gangi | G06K 7/0004 705/18 |
| 2009/0164326 A1* | 6/2009 | Bishop | G06Q 20/02 705/19 |
| 2009/0164330 A1* | 6/2009 | Bishop | G06Q 20/02 705/19 |
| 2009/0164331 A1* | 6/2009 | Bishop | G06Q 20/02 705/19 |
| 2009/0289113 A1* | 11/2009 | Vilnai | B67D 7/34 235/381 |
| 2010/0017284 A1* | 1/2010 | Ross | G06Q 20/204 705/14.33 |
| 2010/0094733 A1* | 4/2010 | Shapira | G06Q 20/202 705/30 |
| 2010/0114724 A1* | 5/2010 | Ghosh | G06Q 20/20 705/24 |
| 2010/0146421 A1* | 6/2010 | New | G06Q 20/20 715/764 |
| 2010/0268612 A1* | 10/2010 | Berrio | G06Q 20/10 705/16 |
| 2010/0280956 A1* | 11/2010 | Chutorash | G06Q 20/20 705/64 |
| 2010/0306069 A1* | 12/2010 | Austin | G06Q 10/06 705/16 |
| 2010/0312631 A1* | 12/2010 | Cervenka | G06Q 20/18 705/14.37 |
| 2010/0325003 A1* | 12/2010 | Ringeman | G06Q 20/18 705/21 |
| 2010/0332385 A1* | 12/2010 | Mersky | G06Q 20/02 705/40 |
| 2011/0125597 A1* | 5/2011 | Oder, II | G06Q 20/20 705/16 |
| 2011/0134044 A1* | 6/2011 | Carapelli | G07F 9/02 345/168 |
| 2011/0153436 A1* | 6/2011 | Krampe | G06Q 20/20 705/16 |
| 2011/0202413 A1* | 8/2011 | Stewart | G06Q 20/10 705/16 |
| 2011/0231648 A1* | 9/2011 | Robertson | G07F 7/1008 713/150 |
| 2011/0238510 A1* | 9/2011 | Rowen | G06K 9/00187 705/16 |
| 2012/0016725 A1* | 1/2012 | Kraft | G06Q 20/20 705/14.11 |
| 2012/0022956 A1* | 1/2012 | Payne | G06Q 20/20 705/16 |
| 2012/0046787 A1* | 2/2012 | Berrio | G06Q 20/10 700/237 |
| 2012/0059694 A1* | 3/2012 | Kuebert | G06Q 20/206 705/14.4 |
| 2012/0078736 A1* | 3/2012 | Denzer | G06Q 20/20 705/16 |
| 2012/0078741 A1* | 3/2012 | DeLine | B67D 7/08 705/26.1 |
| 2012/0084211 A1 | 4/2012 | Petrov et al. | |
| 2012/0095853 A1* | 4/2012 | von Bose | G06Q 20/20 705/16 |
| 2012/0095854 A1* | 4/2012 | Randazza | G06Q 20/02 705/16 |
| 2012/0116575 A1* | 5/2012 | Prosser | G06Q 20/202 700/232 |
| 2012/0221420 A1* | 8/2012 | Ross | G06Q 40/00 705/16 |
| 2012/0265625 A1* | 10/2012 | Pletz | G06Q 20/24 705/16 |
| 2012/0330763 A1* | 12/2012 | Gangi | G06K 7/0004 705/16 |
| 2013/0013431 A1* | 1/2013 | Fansler | G07F 13/025 705/18 |
| 2013/0238453 A1* | 9/2013 | Berrio | G06Q 20/10 705/17 |

OTHER PUBLICATIONS

VeriFone Holdings_SEcure PumpPAY, Anonymous, Pharma Business Work, Sep. 29, 2008: 2074.*
Your Guide to POS revolution Anonymous, National Petroleum News, 92.4, Apr. 2000: 46.*
Extended Search Report received from European Patent Office dated Jun. 4, 2013, corresponding to EPO Application No. 10732229.9, filed Jan. 9, 2010.
International Search Report and Written Opinion dated Mar. 29, 2010 for corresponding PCT International Application No. PCT/US2010/021423.
Press Release issued by ISD Corporation dated Sep. 1, 2010.
VeriFone Holdings, inc.; VeriFone Secure PumpPAY, Anonymous, Pharma Business Work, Sep. 29, 2008: 2074.
Your Guide to POS Revolution, Anonymous, National Petroleum News, 92.4, Apr. 2000: 46.
ANDI Brochure, Allied Electronics, Inc., undated.
Wayne Fusion Brochure entitled "A New Level of Control," dated 2011.
NeXGen Brochure, entitled "The Next Generation of Forecourt Control", Allied Electronics, Inc., undated.
VeriFone V910 Brochure, dated 2010.
Verifone V900 and Viper Brochure, dated 2007.
Request for Supplemental Examination of U.S. Pat. No. 8,438,064, Control No. 96/000127, filed Dec. 2, 2015.
IFSF Standard Forecourt Protocol, Part III.19, EPS POS Interface, Version 1.00, dated Aug. 2002.
IFSF Engineering Bulletin No. 17, version 0.01, dated Oct. 2008.
IFSF Standard Forecourt Protocol, Part 3-26, FDC POS Standard Interface, Version 00.01, dated Nov. 2006.
Payment Card Industry Data Security Standard, Requirements and Security Assessment Procedures, Version 1.2, dated Oct. 2008.
Reasons for Substantial New Question of Patentability Determination dated Jan. 21, 2016, in Control No. 96/000127.
Supplemental Examination Certificate for U.S. Pat. No. 8,438,064 issued Jan. 21, 2016, in Control No. 96/000127.
Non-Final Office Action dated Feb. 18, 2016, in Ex Parte Reexam Control No. 96/000127.
Examiner's Requisition issued by Canadian Intellectual Property Office dated Mar. 3, 2016 in Canadian Patent Application No. 2749876.
Extended European Search Report issued on Apr. 22, 2016 in corresponding EPO application No. 16157076.7, all enclosed pages cited.
Examination Report issued on May 10, 2016 in corresponding EPO application No. 10732229.9, all enclosed pages cited.

* cited by examiner

PAYMENT PROCESSING SYSTEM FOR USE IN A RETAIL ENVIRONMENT HAVING SEGMENTED ARCHITECTURE

CROSS-REFERENCE TO RELATED APPLICATIONS

The present application is a continuation of U.S. patent application Ser. No. 13/872,201, filed Apr. 29, 2013, which is a continuation of U.S. patent application Ser. No. 13/287,786, filed Nov. 2, 2011, now U.S. Pat. No. 8,438,064, which is a continuation of U.S. patent application Ser. No. 12/689,983, filed Jan. 19, 2010, now abandoned, which claims the benefit of U.S. provisional patent application Ser. No. 61/145,578, filed Jan. 18, 2009. The entire disclosure of each of the foregoing applications is hereby incorporated by reference as if set forth verbatim in its entirety herein and relied upon for all purposes.

FIELD OF THE INVENTION

The present invention relates generally to payment processing systems and, more particularly, to payment processing systems used in a retail fueling environment.

BACKGROUND OF THE INVENTION

Payment cards, such as credit cards and debit cards, have become a convenient and preferable method of payment at a number of retail environments, including grocery stores, fueling stations, and other retailers. Accepting payment cards as a method of payment subjects these establishments to security standards and regulations promulgated by the Payment Card Industry ("PCI," also referred to as the PCI Security Standards Council). These standards include the Payment Application—Data Security Standard ("PA-DSS," also referred to as the PCI Data Security Standard) created in an attempt to prevent fraud and other security issues that arise due to the acceptance of payment cards and the transmission of sensitive information associated with the payment cards, such as account number, account holder information, and personal identification numbers ("PIN").

PA-DSS sets forth standards and requirements that must be met by both software and hardware components used to receive, store, transmit, or otherwise handle the sensitive information. Additionally, software and hardware components that are unrelated to the portions configured to handle the sensitive information are subject to the PA-DSS if they are part of the same physical device. The software and hardware components that do not handle sensitive information may include portions that are programmed or created to perform functions unrelated to payment processing. Nonetheless, the entire device must be compliant with PA-DSS because it, in part, handles sensitive information.

By way of an example, several components in a retail fueling environment, i.e., a fueling station, are not designed to handle payment card information. For instance, the point-of-sale ("POS") device may include software components adapted to display a graphical user interface ("GUI") that provides the station's manager with the ability to set options associated with the POS or the fueling station, such as the appearance of the receipts issued by the station's dispensers. If the GUI includes portions that are considered noncompliant pursuant to PA-DSS, then the entire POS will also be considered noncompliant. This makes it difficult to change any portion of the overall system, because all such changes must comply with PA-DSS even when unrelated to payment processing. The changed device may then be subject to an arduous certification process.

SUMMARY OF THE INVENTION

The present invention recognizes and addresses the foregoing considerations, and others, of prior art construction and methods.

In this regard, one aspect of the present invention provides a payment processing system in a retail environment comprising a point-of-sale (POS) module providing an interface for use by an operator of the retail environment to effect sales of fuel, goods, or services (FGS) in the retail environment, a device module operatively connected to at least one retail device configured to supply FGS, the at least one retail device comprising a card reader adapted to receive a first payment card data of a first payment card for payment for the FGS, wherein the device module is adapted to control operation of the at least one retail device, and a payment system module operatively connected to the POS module and the device module, the payment system module adapted to validate payment for the FGS. The payment system module and the device module are separated from the POS module in order to segment the payment system module and the device module that handle the first payment card data from the POS module that does not handle the first payment card data.

Another aspect of the present invention provides a payment processing system in a retail environment comprising a point-of-sale device (POS) configured to provide an interface, wherein the interface is configured to facilitate sales of fuel, goods, or services (FGS) in the retail environment, a payment transaction device operatively connected to the POS and configured to effect payment transactions for the FGS, and a first payment device operatively connected to the payment transaction device and configured to receive a first payment card data from a first payment card. A first portion of the retail environment comprising the POS is segmented from a second portion of the retail environment comprising the payment transaction device and the first payment device in order to segment the second portion that is configured to handle sensitive payment information from the first portion that is not configured to handle sensitive payment information.

Yet another aspect of the present invention provides a method for effecting transactions involving payment card data in a retail environment for fuel, goods, or services (FGS) offered by the retail environment, the method comprising the steps of providing a sales device configured to conduct transactions for the sale of the FGS offered by the retail environment, providing a transaction device operatively connected to the sales device and configured to effect payment transactions using the payment card data for the sale of the FGS offered by the retail environment, providing a payment card device operatively connected to the transaction device, wherein the payment card device is configured to receive the payment card data, and segmenting the sales device that is not configured to handle the payment card data from the transaction device and the payment card device that are configured to handle the payment card data.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
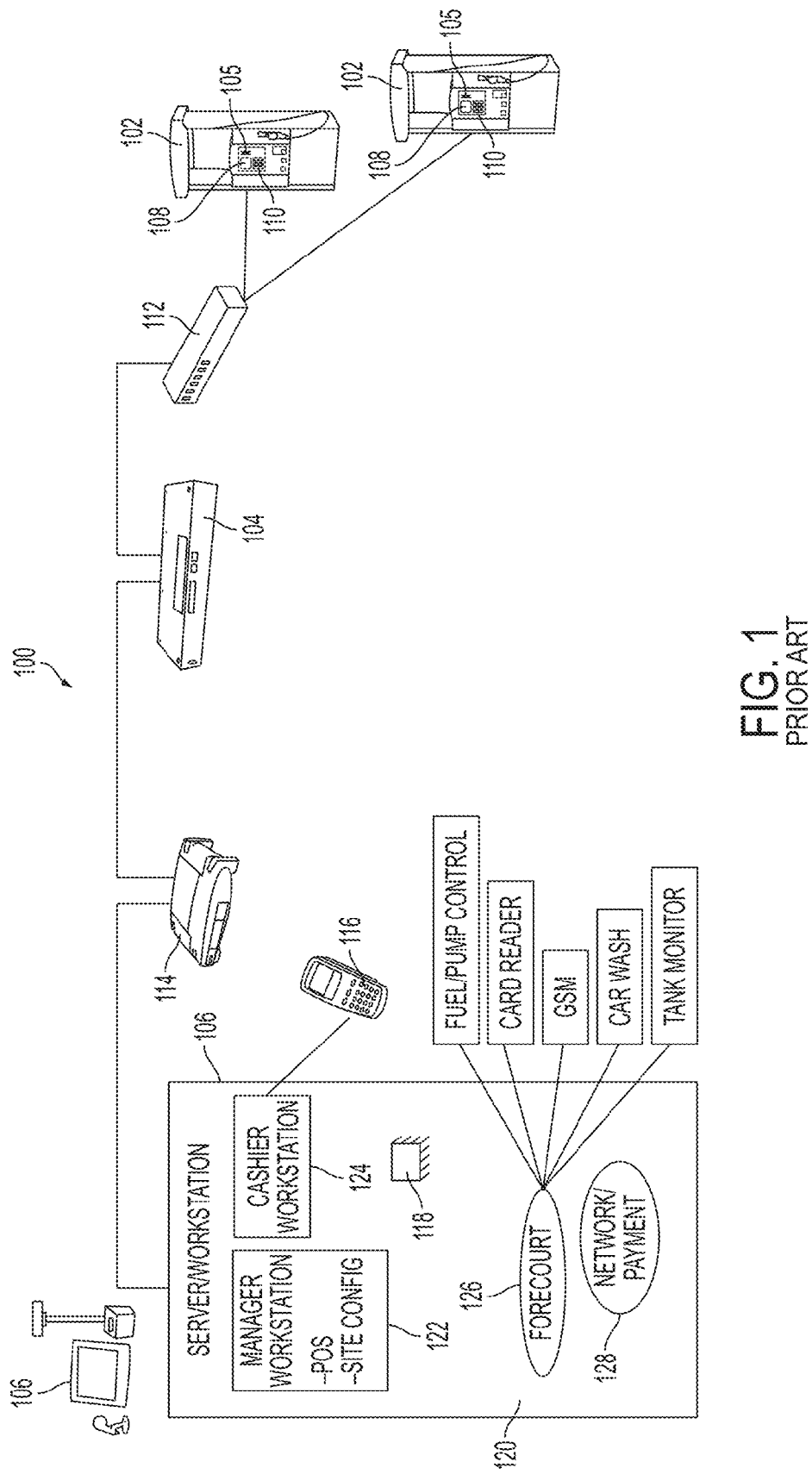
FIG. 1 is a schematic representation of an exemplary payment processing system in a retail fueling environment of the prior art.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 illustrates an exemplary retail fueling environment 100 in accordance with the prior art. Retail fueling environment 100 comprises one or more fuel dispensers 102, a dispenser hub 104, and a server/workstation 106 (hereinafter "server 106"). Each dispenser 102 comprises a customer interface that includes a card reader 105 for reading payment cards, such as credit, debit, or smart cards. As should be understood by those of ordinary skill in the art, the customer interface may include additional components, such as displays 108 and pinpads 110. Dispensers 102 are operatively connected to dispenser hub 104, which may be accomplished via additional devices, such as distribution box or "d-box" 112, as is understood in the art. Dispenser hub 104 is operatively connected to server 106, which may also be accomplished via one or more intermediate devices, such as router 114. Server 106 is operatively connected to a card reader 116 and includes a processor 118 and computer readable medium 120. It should be understood that server 106 is operatively connected to a wide area network ("WAN"), such as the Internet, either directly or via one or more other devices, such as router 114.

In the present example, card reader 116 is a small separate device that includes a pinpad and is configured to receive the information from a payment card swiped or inserted into the reader and to accept a personal identification number ("PIN") entered into the pinpad by a user in certain circumstances.

In the present example, processor 118 executes several software modules located on server 106 including manager workstation module 122, cashier workstation module 124, forecourt module 126, and network payment module 128. The program instructions for software modules 122, 124, 126, and 128 are located on computer readable medium 120.

When executed, manager workstation module 122 displays a GUI that allows the owner, operator, or manager of the fueling station to set options for the fueling environment. Manager workstation module 122 is also adapted to provide point-of-sale ("POS") capabilities, including the ability to conduct transactions for items offered for sale by the fueling station, such as the fuel provided by dispensers 102. Similarly, cashier workstation module 124 provides the station's cashier, clerk, or employee the means necessary to effect a transaction for one or more items or services offered by the fueling station. In another embodiment, manager workstation module 122 and cashier workstation module 124 are the same module. Cashier workstation module 124 is operatively connected to, and controls the operation of, card reader 116.

Forecourt module 126 is adapted to control the operation of devices located in the "forecourt" of retail fueling environment 100 and includes program logic, subroutines, and/or other modules that perform specific functions in this regard. In this example, forecourt module 126 comprises several modules, including fuel/pump control, card reader, GSM, car wash, and tank monitor modules as illustrated in FIG. 1. The fuel/pump control module handles operation of dispensers 102, while the car wash module handles operation of any on-site car washes. The tank monitor module handles operation of any tank monitors connected to the underground storage tanks of the retail fueling environment. The card reader module handles operation of the card readers of retail fueling environment 100, such as card readers 105 of dispensers 102. The GSM module is a security module that handles encryption of the sensitive information transmitted by the components of retail fueling environment 100. For instance, any payment card data received by card readers 105 is handled by the card reader module and encrypted by the GSM module. One example of the GSM module is explained in more detail in U.S. Published Patent Application No. 2009/0154696 (entitled "System and Method for Secure Keypad Protocol Emulation in a Fuel Dispenser Environment"), the entire disclosure of which is hereby incorporated by reference for all purposes as if set forth verbatim herein.

Network payment module 128 is operatively connected to cashier workstation module 124 and forecourt module 126, as well as any other modules or software applications within the fueling environment that require validation of payment card information. For instance, network payment module 128 performs validation of the payment card information received by card readers 105 (via forecourt module 126), as well as card reader 116 (via cashier workstation module 124), as described in more detail below.

In operation, a user positions a vehicle adjacent to one of dispensers 102 and uses the dispenser to refuel the vehicle. For payment, the user inserts and removes a payment card from card reader 105. Card reader 105 reads the information on the payment card and transmits the information to forecourt module 126 via d-box 112, dispenser hub 104, and router 114. It should be understood that data containing sensitive information may be encrypted prior to being transmitted, thereby rendering the communication paths involved secure. The forecourt module 126 provides the payment information to network payment module 128, which contacts a host computer or system operated by the financial institution associated with the user's payment card via the WAN. The financial institution either validates or denies the transaction and transmits such a response to network payment module 128. The information received from the financial institution's host computer system is transmitted from network payment module 128 back to forecourt module 126 to handle appropriately. This may include transmitting to dispenser 102 a request that the user provide another payment card if the transaction is denied or printing a receipt if authorized.

Alternatively, the user may enter a convenience store portion of the retail fueling environment to pay for the dispensed fuel. In this instance, the user inserts and removes a payment card from card reader 116, which transmits the payment card data received from the payment card to cashier workstation module 124. Cashier workstation module 124 provides the payment information to network payment module 128, which contacts the financial institution's system associated with the payment card. The information received from the financial institution is transmitted from network payment module 128 back to cashier workstation module 124 to handle appropriately. This may include instructing a printer connected to server 106 to provide a receipt to the user for the transaction.

Additionally, a user may enter the convenience store portion of the retail fueling environment to purchase one or more of the items offered by the store. The cashier or clerk uses cashier workstation module 124 running on server 106 to tally the total amount of the items the user seeks to purchase. Cashier workstation module 124 communicates with card reader 116, which requests that the user insert his payment card. The user inserts and removes the payment card using card reader 116 and may also enter his PIN using the card reader 116. Card reader 116 transmits the payment card information from the payment card and provides it to the cashier workstation 124, which in turn provides the information to network payment module 128. Network payment module 128 then attempts to process the payment of the transaction in a manner similar to that described above.

In this embodiment, components not designed to handle payment card information, such as manager workstation module 122 and cashier workstation module 124, are included in server 106 along with components designed specifically to handle payment card information, such as network payment module 128. If either module 122 or 124 does not comply with PA-DSS, then the entire server 106 is considered not to be in compliance, including network payment module 128, even if the network payment module would be in compliance standing alone.

For additional information regarding retail fueling environments, reference is made to U.S. Pat. No. 6,453,204 (entitled "Fuel Dispensing System"), U.S. Pat. No. 5,956,259 (entitled "Intelligent Fueling"), U.S. Pat. No. 5,734,851 (entitled "Multimedia Video/Graphics in Fuel Dispensers"), 6,052,629 (entitled "Internet Capable Browser Dispenser Architecture"), U.S. Pat. No. 5,689,071 (entitled "Wide Range, High Accuracy Flow Meter"), and U.S. Pat. No. 6,935,191 ("entitled "Fuel Dispenser Fuel Flow Meter Device, System and Method"), all of which are hereby incorporated by reference for all purposes as if set forth verbatim herein.

Figure 2:
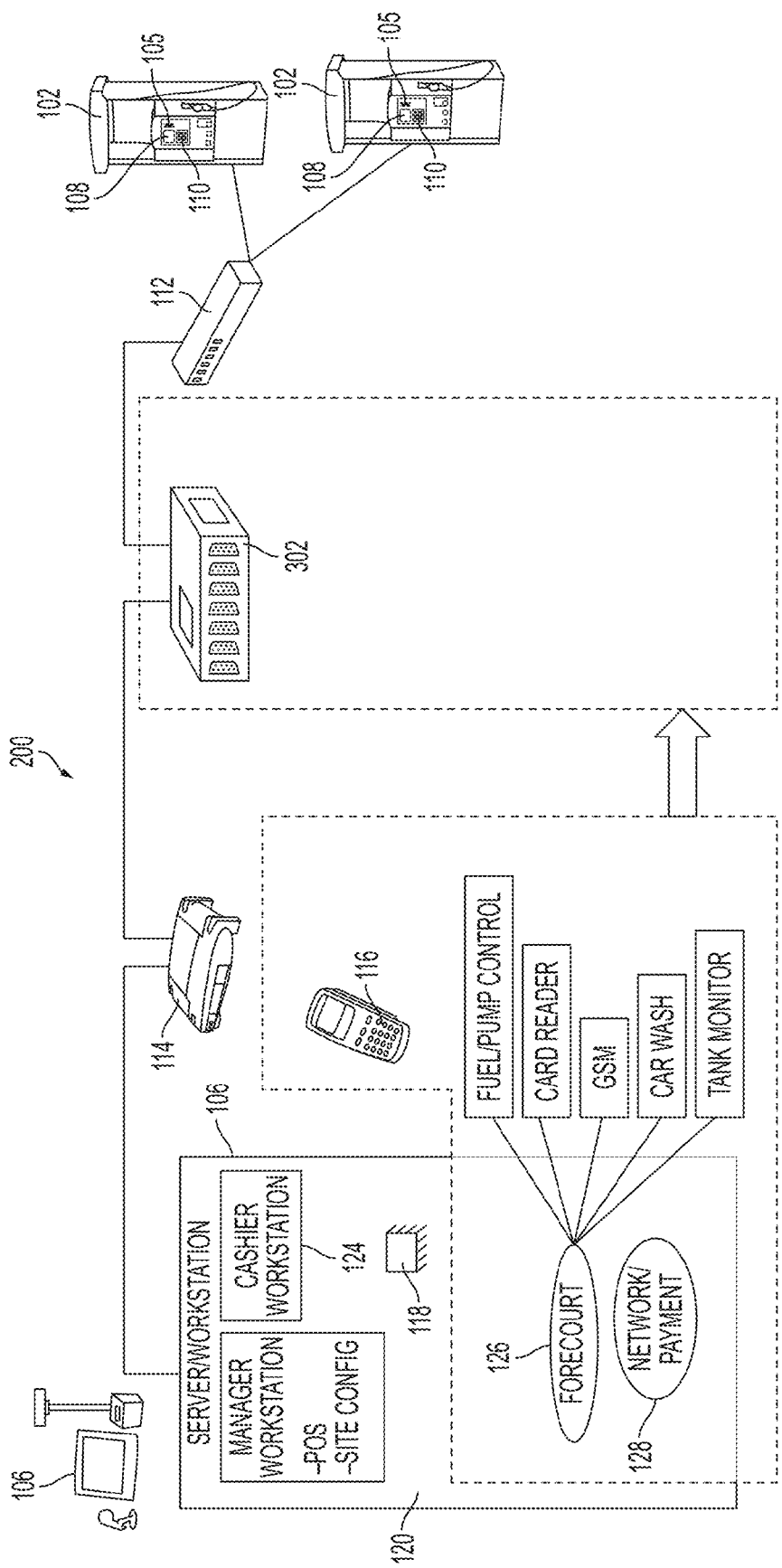
FIGS. 2 and 3 are schematic representations of payment processing systems in a retail fueling environment in accordance with embodiments of the present invention.

FIG. 2 illustrates a retail fueling environment 200 in accordance with an embodiment of the present invention. Retail fueling environment 200 is similar to retail fueling environment 100 of FIG. 1 in many respects, but illustrates a separation and relocation of components of the environment designed to handle payment card information from those components that are not. In this exemplary embodiment, forecourt module 126 and network payment module 128 are relocated to the dispenser hub, which thus becomes an "enhanced" dispenser hub 302 as explained in more detail below. Moreover, as will be explained, card reader 116 is also functionally relocated.

Figure 3:
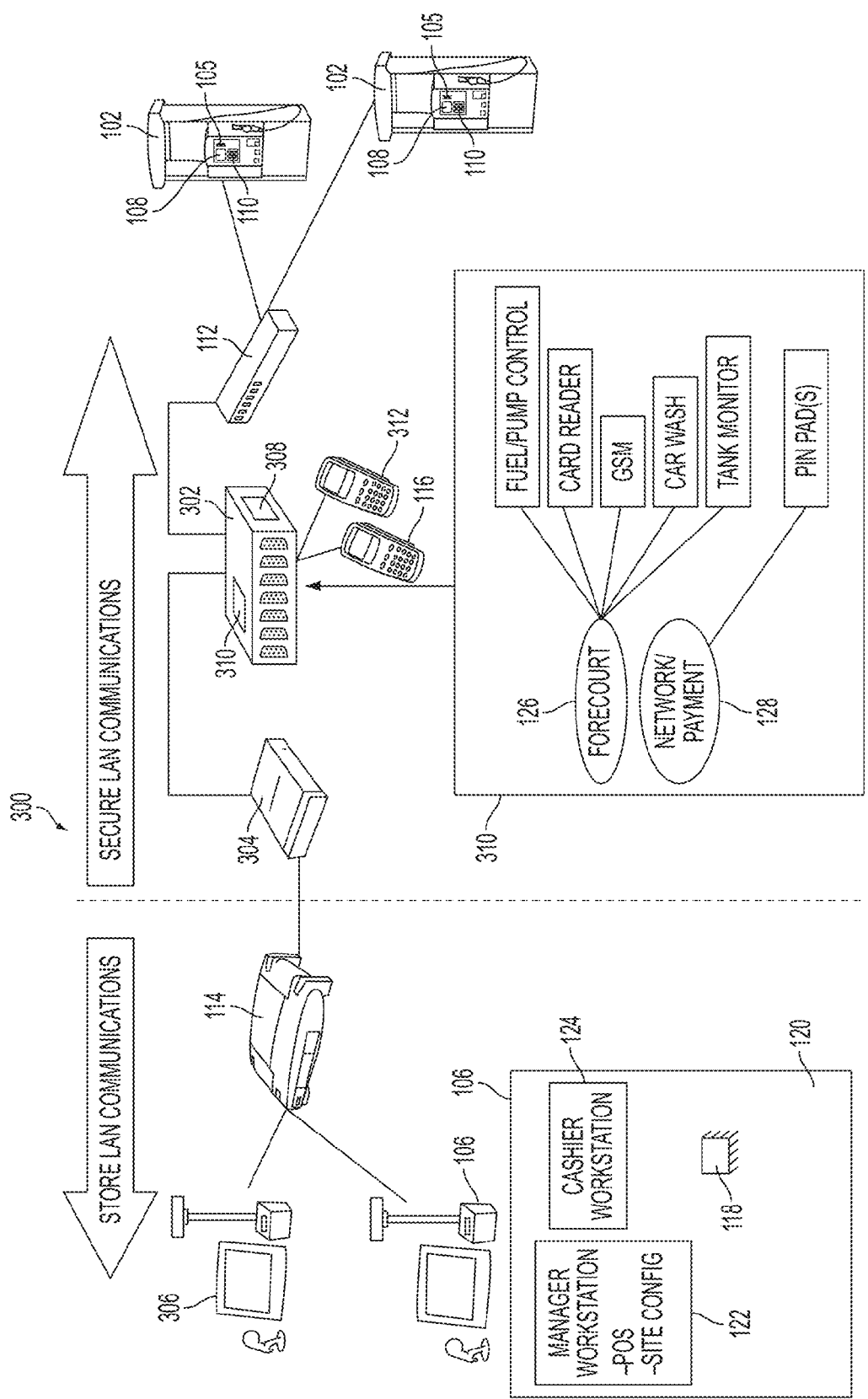

FIG. 3 illustrates a retail fueling environment 300 in accordance with an embodiment of the present invention. As can be seen, dispenser hub 104 of FIG. 1 has been replaced with an enhanced dispenser hub 302. Additionally, a PCI router 304 operatively connects enhanced dispenser hub 302 to router 114 and to the WAN as explained below. Retail fueling environment 300 includes an additional POS 306 in comparison with fueling environments 100 and 200 (FIGS. 1 & 2, respectively). It should be understood that the illustrated components are exemplary in nature, and other devices, such as additional computers, servers, and other hardware or software, may be added to the environment as needed or desired. For example, POS 306 may perform additional marketing functions or other functions desired or required to manage the fueling station.

In the presently-described embodiment, enhanced dispenser hub 302 comprises a processing device 308 and computer readable medium 310. It should be understood that computer readable medium 310 may be any appropriate electronic storage device, such as random access memory ("RAM"), flash memory, EPROMs, hard drives, solid-state storage, CD-ROMs, CDs, DVDs, etc., as long as it is capable of being accessed by processing device 308. Likewise, processing device 308 may be any appropriate processing device capable of accessing computer readable medium 310 and executing the instructions, modules, or software stored thereon including a processor, microprocessor, controller, or microcontroller.

Forecourt module 126 and network payment module 128 are stored on computer readable medium 310 and adapted to be executed by processing device 308. Manager workstation module 122 and cashier workstation module 124 remain located on the computer readable medium 120 of server 106. Card reader 116 is operatively connected to enhanced dispenser hub 302, as is additional card reader 312. Additional software modules may be stored on computer readable medium 310 and executed by processing device 308 as needed. As should be understood, modules may be standalone programs, applications, services, dynamic linked libraries, or a combination or portion thereof. In some embodiments, modules may be hardware or firmware, such as a relay board or microprocessor programmed to perform a specific function.

In this embodiment, PCI router 304 is operatively connected to the WAN and handles communications between devices within retail fueling environment 300 and devices external to the environment via the WAN. In this embodiment, for instance, PCI router 304 is PA-DSS compliant and configured to communicate securely with the financial institution, as well as enhanced dispenser hub 302, in order to effect transactions involving payment cards. PCI router 304 is also operatively connected to router 114 in order to handle communications between server 106 and POS 306 and other devices both internal and external to retail fueling environment 300.

In operation, a user refuels a vehicle using one of dispensers 102 and uses card reader 105 to provide payment information in a manner similar to that described above with respect to FIG. 1. Card reader 105 transmits the payment card information to forecourt module 126, located on enhanced dispenser hub 302. Forecourt module 126 transmits the payment card information necessary to effect a transaction to network payment module 128, which attempts to validate the transaction with the host system of the financial institution associated with the payment card. In this example, payment card information (subject to the requirements of PA-DSS) is handled only by dispensers 102, d-box 112, and enhanced dispenser hub 302. Accordingly, only these devices need to meet and comply with the requirements of PA-DSS.

In the embodiment of FIG. 1, a portion of cashier workstation module 124 manages the operation of card reader 116. In the embodiment of FIG. 3, that portion of cashier workstation module 124 has been extracted and relocated onto computer readable medium 310. Thus, the portion of cashier workstation module 124 managing card reader 116, which handles payment card information, is also located on enhanced dispenser hub 302 and executed by processing device 308. This modular portion may also manage the operation of one or more additional card readers 312. It should be understood that while card reader 116 may be associated with and physically adjacent to either server 106 or POS 306, it is operatively connected to enhanced dispenser hub 302. Accordingly, any data output by card readers 116 and 312 is transmitted to enhanced dispenser hub 302.

Rather than using card reader 105, the user may enter the convenience store to pay for the dispensed fuel. In this example, fuel dispenser 102 transmits data representative of the fueling transaction, such as the total amount due from the user for the dispensed fuel. Enhanced dispenser hub 302 retains any sensitive information in the data but otherwise transmits the non-sensitive data to server 106. At this point, the user may select other fuel, goods, or services offered by the store for purchase. The cashier uses server 106 or POS 306 to perform functions necessary to prepare the transaction to sell the items. For instance, the cashier may use the GUI provided by cashier workstation module 124 running on server 106 to tally the total amount of the items the user seeks to purchase, including any dispensed fuel and tax.

Once the necessary steps have been taken to prepare the transaction as should be known in the art, the transaction information necessary for payment processing, such as total price, is transmitted by cashier workstation module 124 via router 114 and PCI router 304 to enhanced dispenser hub 302. Card reader 116 receives instructions from the module executing on enhanced dispenser hub 302 and requests the user to insert the user's payment card and to provide the corresponding PIN (if necessary). Card reader 116 transmits the payment card information to network payment module 128 which processes the payment in a manner similar to that described above. Payment module 128 and/or card reader 116 transmits the response from the financial institution of the payment processing to cashier workstation module 124 in order for the module to perform additional functions unrelated to the handling of payment card information, such as removing the items purchased by the user from the store's running inventory or printing a receipt confirming the transaction. Accordingly, server 106 and POS 306 are not configured to handle sensitive information, such as payment card data.

Cashier workstation module 124, as well as server 106 and additional POS 306, may perform a number of additional functions, all of which are unrelated to handling payment card information. Because these software and hardware components do not handle payment card information, they are not subject to PA-DSS. Accordingly, these components have been effectively segmented from the software and hardware components that are subject to compliance with PA-DSS. It should be apparent from the above description that only those devices handling or transmitting payment card information, including dispensers 102, d-box 112, enhanced hub 302, and card readers 116 and 312, need to be certified as compliant with PA-DSS. As a result, all modules of the system that are subject to PA-DSS regulations are segmented from the modules of the system that do not require PA-DSS compliance. The computers that comprise only modules that do not require PA-DSS compliance, such as server 106 and POS, also do not require PA-DSS compliance. The segmented architecture avoids the labor and expense required to certify compliance of the devices that do not include modules that handle sensitive information. Additionally, a fewer number of devices and a smaller footprint of the system are subject to PA-DSS compliance. Thus, a smaller portion of the system architecture will need to be changed or upgraded should the applicable security regulations change.

In another embodiment configured to maintain the segmentation of the devices within retail fueling environment 300 configured to handle payment card data from those that are not, enhanced dispenser hub 302 may be configured to create secure reports regarding the financial transactions performed by the enhanced dispenser hub. The secure reports are encrypted and password protected in order to prevent the reports from unauthorized access. Because the reports are secure, users may access the secure reports for which they have proper authorization from devices that do not require PA-DSS compliance. For instance, a manager may select, retrieve, and open a secure report using POS 306 without subjecting the POS to PA-DSS compliance. A more detailed explanation regarding the secure reports is set forth in U.S. patent application Ser. No. 12/544,995 (entitled "Secure Reports for Electronic Payment Systems"), the entire disclosure of which is hereby incorporated by reference for all purposes as if set forth verbatim herein.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. For example, aspects of one embodiment may be combined with aspects of other embodiments to yield still further embodiments. Therefore, it is contemplated that any and all such embodiments are included in the present invention as may fall within the scope and spirit thereof.

What is claimed is:

1. A retail fueling environment having a secure LAN portion including a plurality of fuel dispensers, each fuel dispenser generating non-sensitive transaction data and having a customer interface with a dispenser card reader and a PIN pad to receive sensitive payment information from a customer, characterized in that the retail fueling environment includes:
   (a) a store LAN portion of the retail fueling environment comprising a server workstation having a cashier work station that provides means for effecting a transaction for one or more items offered for sale by the retail fueling environment, the store LAN portion of the retail fueling environment does not handle sensitive payment information and is segmented from the secure LAN portion that handles the sensitive payment information;
   (b) at least one customer card reader for receiving the sensitive payment information from the customer, the customer card reader being a part of the secure LAN portion of the retail fueling environment and associated with the server workstation; and
   (c) an enhanced dispenser hub that is part of the secure LAN portion of the retail fueling environment, the enhanced dispenser hub device:
      (i) receives the sensitive payment information from the dispenser card reader and from the at least one customer card reader;
      (ii) receives the non-sensitive transaction data from the fuel dispensers;
      (iii) transmits the sensitive payment information and non-sensitive transaction data such that the: sensitive payment information is not transmitted to the store LAN portion of the retail fueling environment and is transmitted to a financial institution for validation of the transaction; and, non-sensitive transaction data is transmitted to the server workstation; and,
      (iv) controls the operation of the fuel dispensers.

2. The retail fueling environment according to claim 1, characterized in that the store LAN portion of the retail fueling environment further includes, in addition to the server workstation, a point of sale server device which receives the non-sensitive transactional data from the enhanced dispenser hub.

3. The retail fueling environment according to claim 1, characterized in that the secure LAN portion of the retail fueling environment further includes an additional customer card reader for receiving the sensitive payment information from the customer, the output of the additional customer card reader being transmitted to the enhanced dispenser device.

4. The retail fueling environment according to claim 1, characterized in that the retail fueling environment further includes a secure router in the secure LAN portion of the retail fueling environment, the secure router operably connected for communication between the enhanced dispenser hub and the store LAN portion of the retail fueling device.

5. The retail fueling environment according to claim 4 characterized in that the secure router connects the enhanced dispenser hub to wide area network (WAN) for communication between devices in the retail fueling environment and devices external to the retail fueling environment.

* * * * *